United States Patent [19]

Csaszar et al.

[11] Patent Number: 5,937,404
[45] Date of Patent: Aug. 10, 1999

[54] APPARATUS FOR BLEACHING A DE-ACTIVATED LINK IN A WEB PAGE OF ANY DISTINGUISHING COLOR OR FEATURE REPRESENTING AN ACTIVE LINK

[75] Inventors: Andras Csaszar, Los Altos; Stephen Friedman, Mountain View, both of Calif.; Gabor Ligeti, Budapest, Hungary

[73] Assignee: Appaloosa Interactive Corporation, Palo Alto, Calif.

[21] Appl. No.: 08/842,029

[22] Filed: Apr. 23, 1997

[51] Int. Cl.[6] .................................................. G06F 17/30
[52] U.S. Cl. .............................. 707/9; 707/2; 370/465; 395/187.01
[58] Field of Search .................. 707/2, 9, 10; 370/465; 395/187.01

[56] References Cited

U.S. PATENT DOCUMENTS

| | | | |
|---|---|---|---|
| 4,718,107 | 1/1988 | Hayes | 455/4.1 |
| 5,329,619 | 7/1994 | Pagé et al. | 395/200 |
| 5,553,239 | 9/1996 | Health et al. | 395/187.01 |
| 5,572,643 | 11/1996 | Judson et al. | 395/793 |
| 5,636,211 | 6/1997 | Newlin et al. | 370/465 |
| 5,678,041 | 10/1997 | Baker et al. | 707/9 |
| 5,696,898 | 12/1997 | Baker et al. | 395/187.01 |
| 5,721,906 | 2/1998 | Siefert | 707/9 |
| 5,765,152 | 6/1998 | Erickson | 707/9 |
| 5,778,367 | 7/1998 | Wesinger, Jr. | 707/10 |

FOREIGN PATENT DOCUMENTS

| | | | |
|---|---|---|---|
| 0720336A2 | 7/1996 | European Pat. Off. | H04L 29/06 |
| 0723369A1 | 7/1996 | European Pat. Off. | H04N 7/00 |
| 0737930A1 | 10/1996 | European Pat. Off. | G06F 17/30 |
| 07488095A2 | 12/1996 | European Pat. Off. | H04L 29/06 |
| WO 96/29663 | 9/1996 | WIPO . | |

OTHER PUBLICATIONS

Sandhu & Samarati, Access Control: Priciples and Practice, IEEE Communications Magazine, Sep. 1994.

Resnick & Miller, PICS: Internet Access Controls Without Censorship, Communications of the ACM, Oct. 1996.

"Proxy Tools Offer Custon Web Access; Proxy Servers Allow Companies to Restrict Access to Designated Internet, WWW Sites", PCWeek, p. 31, Aug. 1995.

(List continued on next page.)

*Primary Examiner*—Thomas G. Black
*Assistant Examiner*—Charles L. Rones
*Attorney, Agent, or Firm*—Michael A. Glenn

[57] ABSTRACT

A system for organizing access to a database that is distributed over an electronic network includes a system site on a dedicated server. A list of addresses to approved database sites on an electronic network stored on the system site is accessed by a user with a browser application. Reference cards permit the user to search and review the list of approved sites. In a first preferred embodiment, a request for access to a database site is made to the dedicated server. Access is denied for a non-approved site. An approved database is retrieved by the dedicated server. Each database link to an approved site is modified from direct to indirect to require all future access to be directed through the dedicated server. Links not in the list of approved sites will have their access denied. In a second, equally preferred embodiment, code defining a database location is removed at the dedicated server to de-activate links to non-approved database sites. The words representing the de-activated links are bleached of any indicia that represent the previous electronic network link. In a third embodiment of the invention, a framed screen display overrides the browser application display to prevent a user from defining a location for independent access to the electronic network. The only access to the electronic network is provided through the dedicated server and the user is thereby restricted to accessing the approved sites.

14 Claims, 5 Drawing Sheets

OTHER PUBLICATIONS

"PICS Pick Up Steam . . .", Business Wire, p. 3141261, Mar. 1996.

"Internet Acess; Net Nanny and SafeSurf Merge Technologies", Edge: Work–Group Computing Report, Feb. 1997.

"Watchdog Applications Protect Children Online—Software Lets Parents Screen Kid's Access to Adult Content", Computer Retail Week, p. 41, Nov. 1995.

"What the Devil's Going on at .edu?; A tour of University Web Sites is Quite an Education", Electronic Engineering Times, p. 1, Feb. 1996.

"Net Nanny in Download Test With GTE", News Release from web site:http://www.netnanny.com/news_archive/960314.htm., Mar. 1996.

"U.S. Children: Hi–Tech Nannies Catch Smut, Protect Free Speech", Inter Press Service, Jul. 1995.

"Net Nanny Chosen as 1996 winner of the John C. Dvorak Awards for Telecommunications Excellence; Winner of Outstanding Special Purpose Applications Category", Business Wire, p. 0791057, Jul. 1996.

"Marketing Assn Blames Parents For Online Child Safety", Newsbytes, Jun. 1996.

APPARATUS FOR BLEACHING A DEACTIVATED LINK IN A WEB PAGE OF ANY DISTINGUISHING COLOR OR FEATURE REPRESENTING AN ACTIVE LINK

BACKGROUND OF THE INVENTION

1. Technical Field

The invention relates to database systems. More particularly, the invention relates to a system for organizing access to a database that is distributed over an electronic network.

2. Description of the Prior Art

Electronic networks are increasingly being used to store and distribute data. Examples of such electronic networks include the Internet, and intranet systems. Electronic networks such as the World Wide Web (WWW) are used to distribute a variety of data types. For example, a WWW page may include text, graphical displays, video displays, animation, and sounds.

Software programs are also being distributed via such electronic networks. With the advent of software applications such as the JAVA ™, software application developed by Sun Microsystems™, Inc. of Mountain View, Calif., individual software applications may be stored at a central location, or server, and accessed as needed by a user.

FIG. 1 is a diagram of a database distribution system on an electronic network, according to the prior art. Such databases may include any stored data that is available for distribution over an electronic network, such as the Internet. Such databases include World Wide Web (WWW) pages, Newsgroup postings, Internet Relay Chat channels, and electronic mail (email) storage.

Two methods are commonly used to access a destination point, such as a database 10, 12, 14. Each destination point has an address representing its virtual location on the electronic network. In the first method, the user 16 accesses the destination point by contacting its address using available navigation facilities in a software application, such as a browser.

FIG. 2 is a screen shot 20 of a web browser, according to the prior art. A web browser typically permits the user to input the address of a destination point, for example into a requestor 22, or to select a previously stored or "bookmarked" destination point 24. In response to such request, the browser directly contacts the destination point to retrieve the desired data. For example, in the example of FIG. 1, the user 16 can access database 12 by inputting its address into a requester, or by selecting a stored "bookmark" address. The retrieved data is then displayed, for example, on a computer system monitor in communication with the electronic network.

Alternatively, the user may access a destination point through information presented in the browser application, e.g. WWW pages that include Hyperlinks (links). A link 26 is a connection to another address on the electronic network embedded within the software of the displayed database location. For example, a WWW link is typically encoded within the Hypertext Markup Language (html) of the WWW page. Such links include text links and graphical displays.

The linked address locations may be on the same or on different servers. The user selects a link using means such as clicking with a pointer device, or keyboard commands. The destination point represented thereby is then contacted by the browser application. For example, the user can access database 12 by first accessing database 10 and selecting a link 18 to database Many electronic networks are unregulated, or difficult to regulate, as to content. Such electronic networks may include a wide variety of services that are unsuitable for certain age groups. Furthermore, users of an electronic network are frequently distracted by services that are unrelated to their particular needs. For example, office workers provided with electronic mail (email) access are often found playing games that are distributed on the Internet.

The need has therefore arisen for a system to organize and restrict access to databases that are distributed on an electronic network.

In Nederlof, Access method retrieving Internet information through Teletext/Videotex and the reverse, European Patent Application No. EP 723 369 (Jul. 24, 1996), a method is provided for transforming WWW protocol information in WWW pages. The protocol information is transformed by suppressing graphic information and transforming hypertext links into menu-driven controls.

This method, however, does not restrict the information available to the user. In fact, the method is directed to allowing "every individual to access the information stored in the international community of Internet through his existing television set and telephone . . ." Thus, the graphic information is suppressed to increase a user's access to the Internet. Such method is not directed to restricting, for example, a child's access to inappropriate databases.

Judson, Web Browser With Dynamic Display of Information Objects During Linking, U.S. Pat. No. 5,572,643 (Nov. 5, 1996) discloses a method for Internet browsing. The browser provides for the insertion of a message while a document is being downloaded. The patent also discloses the embedding of an information object within an existing WWW page. The embedded object is masked until a link to another WWW page is activated. At such time, the embedded object is displayed to the user. Judson is not directed to organizing access to an electronic database. Rather, Judson teaches a method for enhancing "the operation of a web browser by causing the display of some useful information to the user during the period of user 'downtime' that otherwise occurs between linking and downloading of a hypertext document . . ." The user may request access to any site on the electronic network while using the Judson browser.

Nielsen, Method and system for comicstrip representation of multimedia presentations, European Patent No. EP 737 930 (Oct. 16, 1996) describes a method for displaying a summary representation of a larger work. While the Nielsen system organizes multimedia data, it does not control a user's access to the Internet.

It would therefore be an advantage to provide a system for organizing access to a database that is distributed over an electronic network. It would be a further advantage if such system were able to contour the database sites on the electronic network to restrict a user to pre-approved sites.

SUMMARY OF THE INVENTION

The invention provides a system for organizing access to a database that is distributed over an electronic network. A list of addresses to approved database sites on an electronic network is stored on a system site on a dedicated server. A user electronically accesses the server with a browser or other application.

Reference cards permit the user to search and review the list of approved sites prior to selection. Requests for data from approved sites on the electronic network are directed to the system site. The dedicated server directly accesses the electronic network to retrieve the requested data for transmission to the user. The dedicated server thereby functions as a transparent mediator accessing only the approved sites on the electronic network.

In a first preferred embodiment of the invention, a request for access to a database site is made to the dedicated server. The server compares the requested destination point to a list of approved sites. If the requested destination point is not in the list of approved sites, the dedicated server denies the request for access. An approved database is retrieved from its database server by the dedicated server. Each approved link inside the database is modified from direct to indirect to require all future access to the approved link to be directed through the dedicated server. Links not in the list of approved sites will have their access denied.

In a second, equally preferred embodiment of the invention, links that are not in the approved list are removed from the requested database by the link modifying and deactivating/bleaching module in the dedicated server. The removal process strips the element from its linking qualities by removing a portion of the code defining the link and renders the non-approved links inactive. The element may also be stripped of any features that signal the presence of a link, such as an identifying color.

In a third embodiment of the invention, a framed screen display organizes access to the approved sites via the dedicated server. The frame overrides at least a portion of the browser application display to prevent a user from inputting a destination address to define a location for independent access to the electronic network. The only access to the electronic network is provided through the dedicated server and the user is thereby restricted to accessing the approved sites.

DETAILED DESCRIPTION OF THE INVENTION

The invention provides a system for organizing access to a database that is distributed over an electronic network. A list of addresses to approved database sites on an electronic network, such as the Internet, is stored on a dedicated server computer system. The server functions as a transparent mediator to permit access to only the listed approved sites, thereby contouring the database information available to a user.

Figure 1:
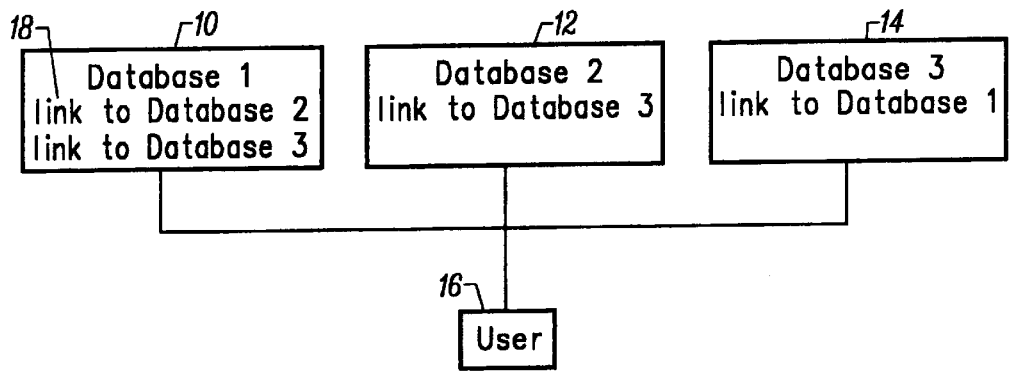
FIG. 1 is a diagram of a database distribution system on an electronic network, according to the prior art.
Figure 3:
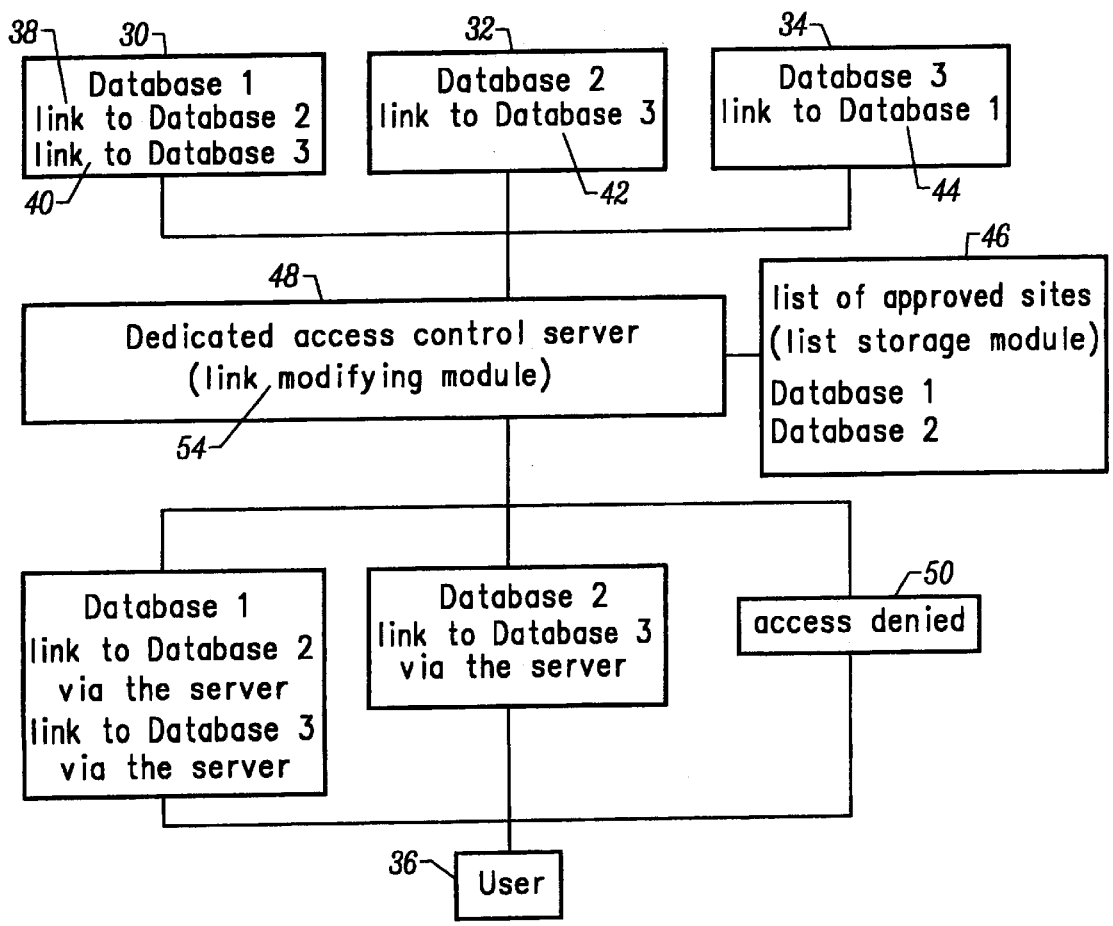
FIG. 3 is a schematic diagram of the system for organizing access to a database, according to a first preferred embodiment of the invention.
Figure 2:
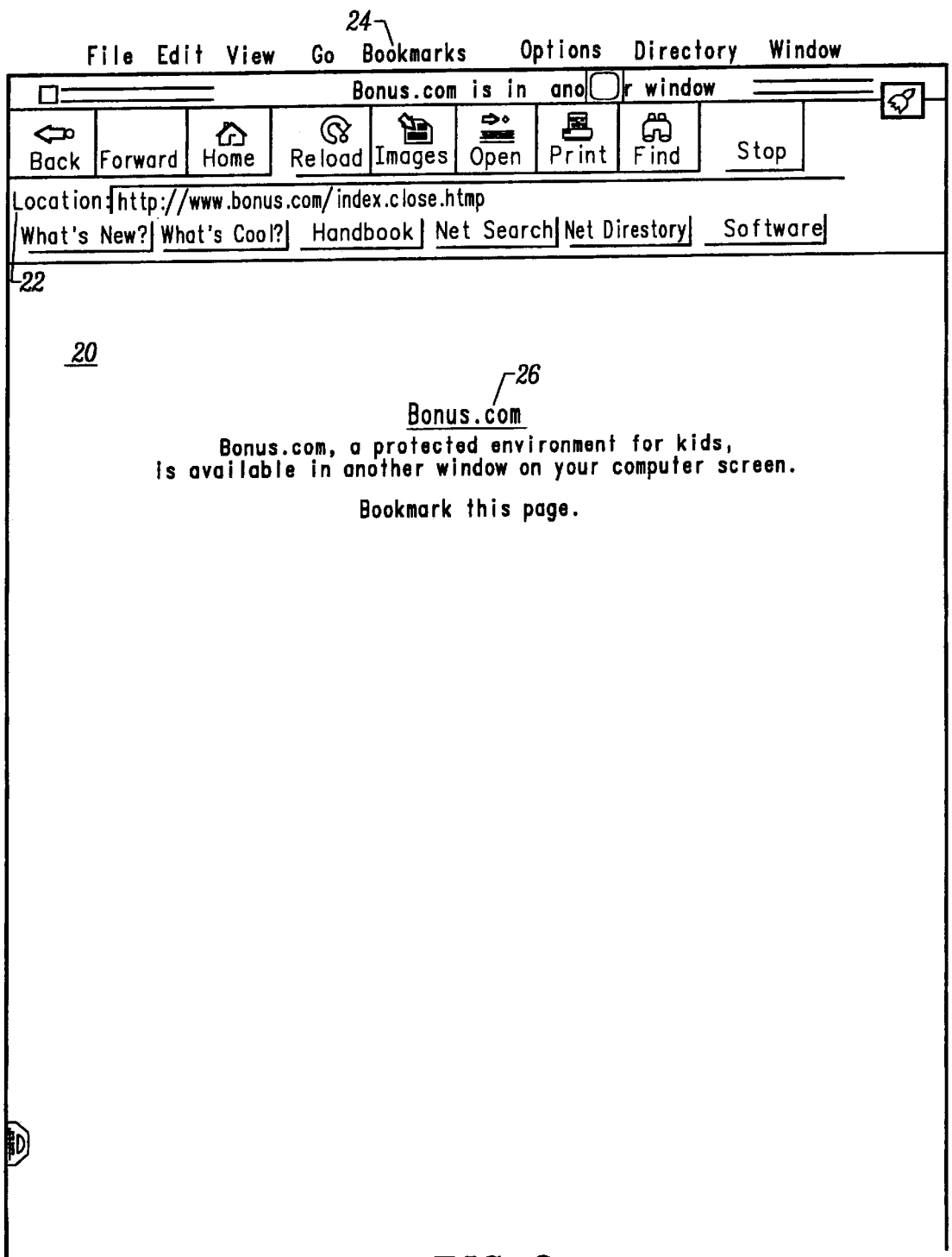
FIG. 2 is a screen shot of a web browser, according to the prior art.

FIG. 3 is a schematic diagram of a system for organizing access to a database, according to a first preferred embodiment of the invention. The database may include any stored data that is available for distribution over an electronic network, such as the Internet. Such databases include World Wide Web (WWW) pages, Newsgroup postings, Internet Relay Chat channels, and electronic mail (email).

A user 36 can access databases only via the dedicated server. When a request for access is made to the dedicated server via a software application, such as a browser, the server compares the requested destination point to a list of approved sites. The module 46 storing the list of approved sites may be stored on the dedicated server or at a remote location accessed by the server and is readily created by one skilled in the applicable art, using well-known software applications and hardware components.

The list of approved sites may be updated, as desired, by an editor who screens databases for their content. Alternately, the software enabling the system site may be configured to automatically approve databases meeting predefined criteria. For example, a system site serving the electronics industry may be configured to automatically approve all sites whose title refers to electrical engineering. A system site serving children may include only databases reviewed by an editorial board for age-appropriate content.

If the requested destination point is not in the list of approved sites, the dedicated server denies the request for access. If the database has been previously approved and is in the list, access is approved. The dedicated server then retrieves the requested database from its database server.

When a database passes through the dedicated server 48, each link 38, 40, 42, 44 inside the database is modified from direct to indirect. As a result, when a link is later activated, the link will request the referenced database through the dedicated server. Links not in the list of approved sites, for example, a link 40 to database 34, will have their access denied 50 by the link modifying module 54 in the dedicated server. The requested database is then passed to the user. Thus, all subsequent accesses to the requested database and linked databases, for example, through use of a bookmark, must also pass through the dedicated server.

Figure 4:
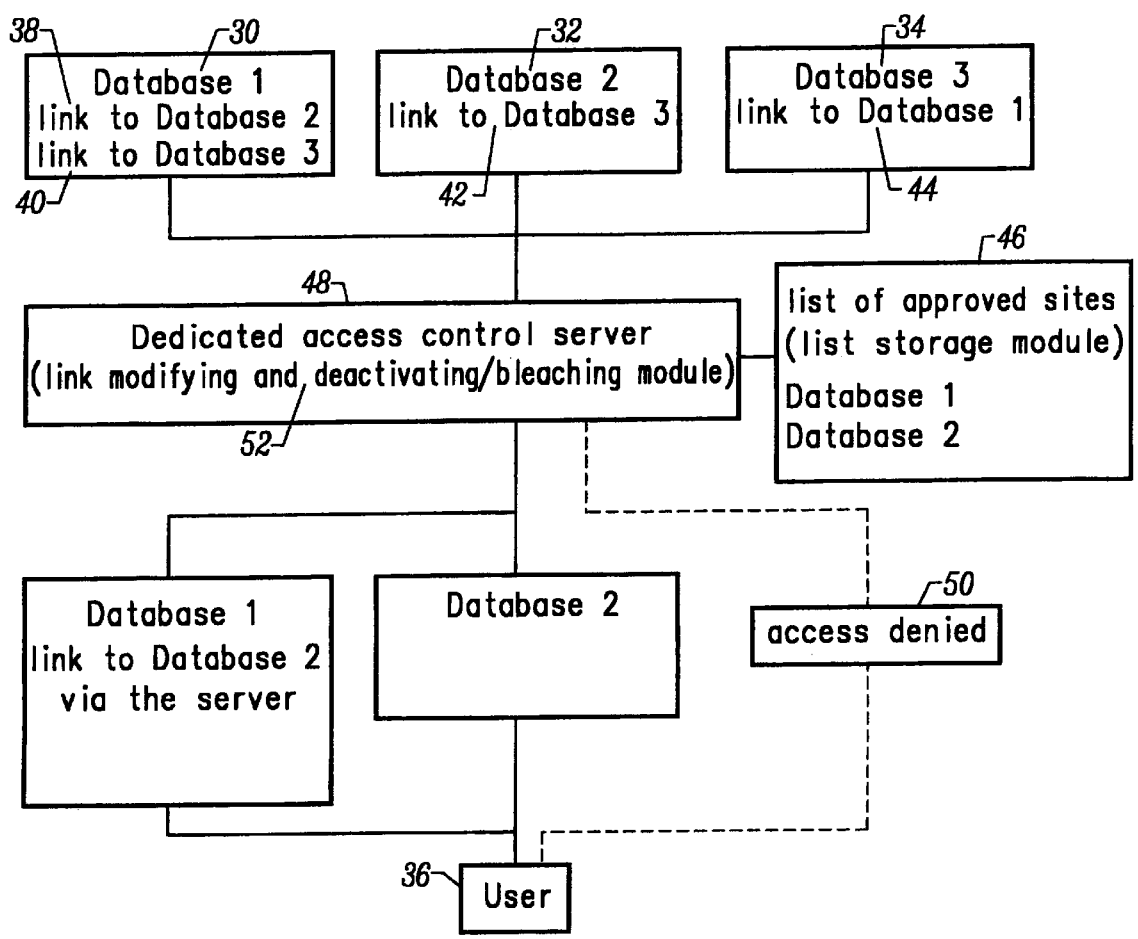
FIG. 4 is a schematic diagram of a system for organizing access to a database, according to a second, equally preferred embodiment of the invention.

FIG. 4 is a schematic diagram of a system for organizing access to a database, according to a second preferred embodiment of the invention. In this second embodiment, when the requested database passes through the dedicated server, each link 38, 40, 42, 44 inside the database is compared with the list of approved sites 46. Links in the list of approved sites are modified from direct to indirect.

However, links that are not in the approved list are removed from the requested database by the link modifying and deactivating/bleaching module 52 in the dedicated server 48. The removal process renders the non-approved links inactive, such that clicking on the link will not result in a new database request. This deactivation process strips the element (e.g. word, graphic object) from its linking qualities by removing a portion of the code defining the link. The element may also be stripped of any features that signal the presence of a link, such as an identifying color. Thus, the user will not be aware that a link has been deactivated.

In the example illustrated by FIGS. 3 and 4, Database1 30 and Database2 32 have been approved for access, but Database3 34 has not. Database1 has links to both Databases2 and 3, Database2 has a link to Database3, and Database3 has a link to Database1. Table 1 is a Hypertext Markup Language (HTML) description of the example shown in FIG. 3.

The contour description 56 is an indirect description directed to the dedicated server. When received by the dedicated server, the contour description results in the retrieval of Database1 30 [www.database1.com] by the dedicated server.

TABLE 1 http://www.database1.com/

```
<HTML>
... data ... <a href="http://www.database2.com/">Database2</a>
... data ... <a href="http://www.database3.com/">Database3</a>
</HTML>
http://www.contour.com/www.database1.com/                    56
```

In the first preferred embodiment of the invention, as Database1 passes through the dedicated server, the inside links to Databases2 and 3 32, 34 are modified as follows:

TABLE 2 http://www.database1.com/

```
<HTML>
... data ... <ahref="http://www.contour.com/www.database2.com/">Database2</a>   58
... data ... <ahref="http://www.contour.com/www.database3.com/">Database3</a>   60
</HTML>
```

A user request for Database 2 generates the coded request:

http ://www.contour.com/www.database2. com/.

This code forces the electronic network to indirectly transfer Database2 to the user through the dedicated server. In the example, Database2 is in the list of approved sites, and the transfer will take place.

A user request for Database generates the coded request:

http://www.contour.com/www.database3. com/.

However, since Database3 is not in the approved list, this request will be denied by the dedicated server and the transfer will not take place.

In the second, equally preferred embodiment of the invention, the links inside Database1 are modified differently. In this embodiment, accessing the contour description "http://www.contour.com/www.database1.com/" 56 yields the following HTML code:

TABLE 3 http://www.database1.com/

```
<HTML>
... data ... <ahref="http://www.contour.com/www.database2.com/">Database2</a>   58
... data ... Database3                                                          62
</HTML>
```

The coded tags <a href . . . > and </a> defining the text "Database3" as an active link have been removed 62. Thus, this line will be represented as a text line that says "Database3" but this line will not act as an active link. The approved link, Database2, retains the <a href . . .> and </a> tags and remains an active link 58.

Figure 5:
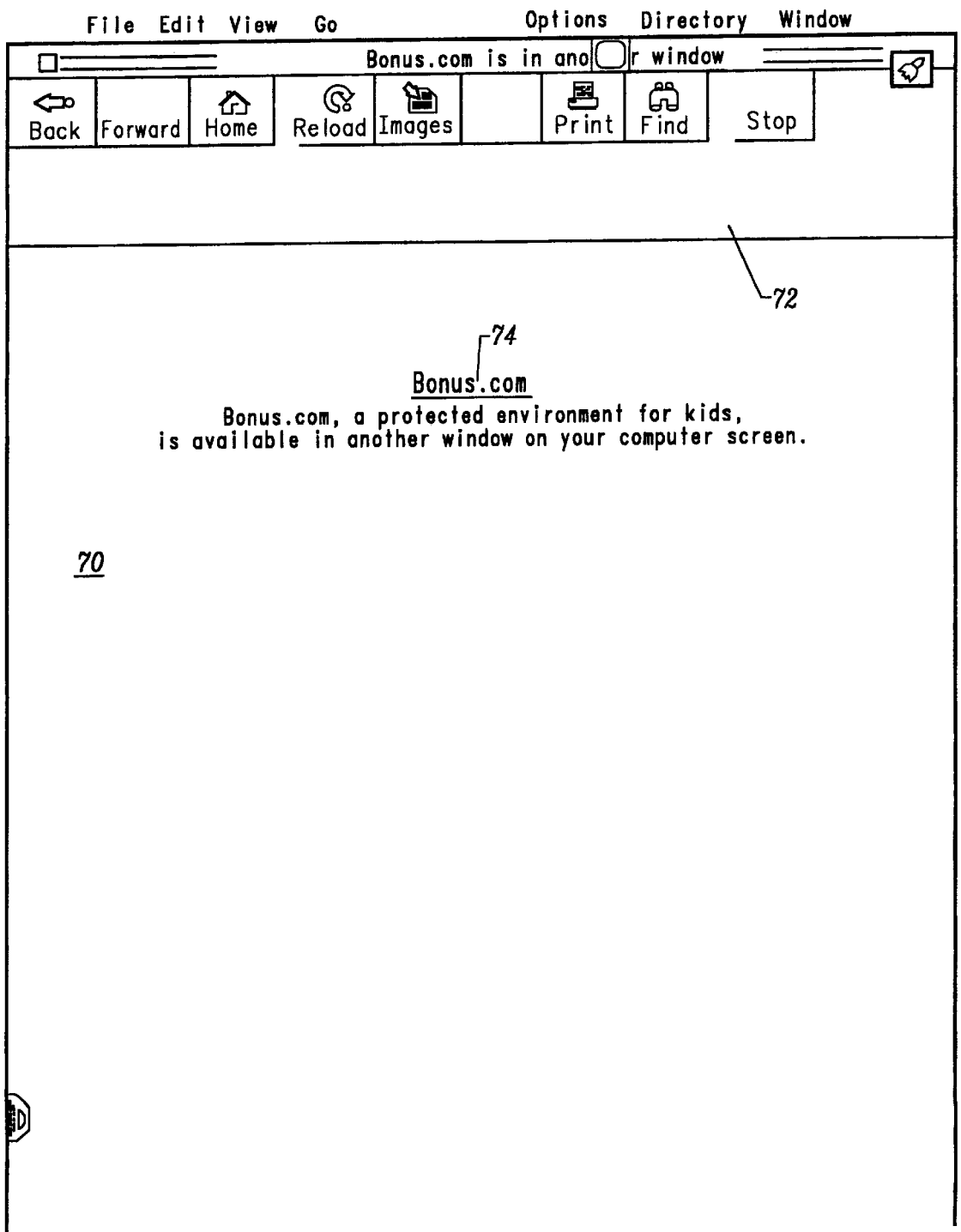
FIG. 5 is a screen shot of a framed web browser, according to a third preferred embodiment of the invention.

In a third embodiment of the invention, a framed screen is used to restrict access to undefined destination points. FIG. 5 is a screen shot of a framed web browser 70 according to the invention. The frame 72 overrides at least a portion of the browser application display to cover, for example, a requestor or a bookmark list. The user is not permitted to input a destination address to define a location for independent access to the electronic network. The user is thereby restricted to accessing approved sites via the dedicated server.

The framed screen display organizes access to the approved sites via the dedicated server. The only access to the electronic network is provided through the dedicated server and the user is thereby restricted to accessing the approved sites.

The framed screen display may be configured to provide a listing, or index of the approved sites. The user searches the listing and selects items of interest for viewing. Additionally, the system site may have a dedicated database including software, games, data, sound, or video applications available for direct downloading by the user.

In one embodiment of the invention, only the framed screen display is used to restrict access to undefined destination points. Alternatively, the framed screen display is implemented with either or both of the link modification approaches discussed above. For example, a link may be deactivated 74. A user is thereby prevented from directly inputting a destination address, from selecting a previously-stored address from a bookmark list, or from accessing a link to a non-approved site. The first two equally preferred embodiments of the invention may also be implemented without using a framed screen display.

The framed display may include text, graphical or video displays to permit the user to navigate within the confines of the system site. The preferred embodiment of the invention enables the JAVA ™ software application developed by Sun Microsystems™, Inc. of Mountain View, Calif. JAVA™ applications, or "applets" may be used to access features of the site, such as a search engine or a game. Applets may also be used to request data via the dedicated server, or to display information downloaded therefrom.

A software search engine permits the user to search and review the approved sites prior to selection. In the preferred embodiment of the invention, this search engine comprises reference cards. The reference cards are displayed within the confines of the framed screen display and include descriptive information regarding the approved database locations. The user requests data by selecting the particular reference card, for example, by clicking on the card with a pointer device.

Figure 6:
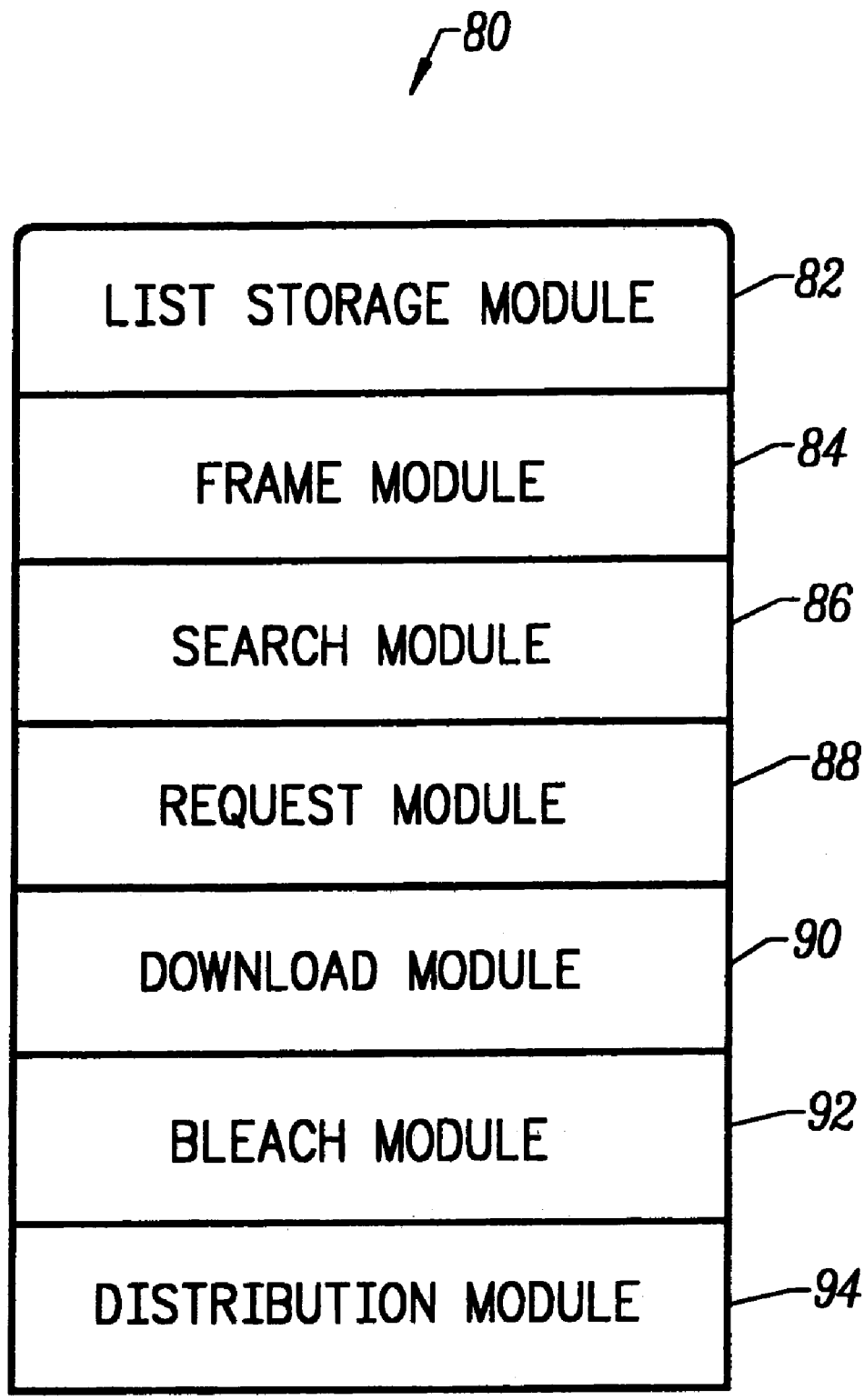
FIG. 6 is a diagram of the system site, according to the invention.

FIG. 6 is a diagram of the system site 80 according to the invention. The site is enabled by software applications including a plurality of software modules that are accessed by the dedicated server to control the database access system. The software applications may be stored either on the dedicated server, or on another device accessible thereto, such as a desktop computer.

A list storage module 82 is available to store the list of approved database locations. The user is thereby provided with a contoured information database that restricts access to the approved databases. A frame module 84 produces a screen display that restricts the user from directly accessing a database location that is not a part of the approved list.

The search engine, for example, the reference cards, is enabled by a search module 86. The request module 88 permits the user to select among the contents of the approved list. The dedicated server retrieves the requested information from the electronic network using the download module 90. The bleach module 92 removes code from the downloaded data to deactivate and bleach non-approved links. The requested information is then transmitted to the user by the distribution module 94. One skilled in the art will readily appreciate that the system site may be configured to include fewer or additional modules, as desired.

Although the invention is described herein with reference to the preferred embodiment, one skilled in the art will readily appreciate that other applications may be substituted for those set forth herein without departing from the spirit and scope of the present invention.

For example, the system site may be located on a network of dedicated servers. Individual modules of the software applications enabling the system site may also be stored on different computers within a networked system.

The system site may include interactive areas to permit the user to provide data to the system site, or to communicate with the system operator. The system site may be configured to permit or restrict the user from submitting data to a database on the approved list.

The invention may be used with any suitable commercial browser application for accessing data via an electronic network. The invention is applicable to both Internet and intranet database systems.

The contouring process that restricts access to non-approved databases provides a safe, controlled environment for users of an electronic network. For example, children are only permitted access to databases having age-appropriate subject matter. Because the database is contoured according to specific parameters, such as age or subject matter, it may be searched efficiently for related topics of interest.

Accordingly, the invention should only be limited by the Claims included below.

We claim:

1. A system for organizing access to a database that is distributed over an electronic network, said system including a dedicated server having a system site thereon, said system site comprising:

a list storage module for storing a list of approved databases;

a frame module for producing a screen display that restricts the user from directly accessing said electronic network;

a search module for searching said list;

a request module for selecting a database from said list a download module for retrieving said selected database from said electronic network;

a bleach module for de-activating and bleaching a link in said selected database to a database not included in said stored list; and a distribution module for transmitting said selected contents to said user.

2. A system for controlling access to a database that is distributed over an electronic network, comprising:

a client having restricted access to said network;

a dedicated server in communication with said client and said network for restricting client access to said network;

a system site on said dedicated server having a list of at least one address of at least one approved database site on said network stored thereon;

said dedicated server accessing a database site in said list in response to a request from said server, and transmitting contents of said database site to said server;

a module for modifying a link in said database site to a second database site to require access to said second database site to be accessed via said dedicated server;

a module for modifying a link to a second database site included in said list to require access to said second database site to be accessed via said dedicated server;

a module that de-activates a link to a third database site not in said list to restrict access to said third database site; and means for bleaching said de-activated link of any distinguishing color representing an active link.

3. The system of claim 2, further comprising a framed screen display to replace a standard user interface.

4. The system of claim 3, wherein said framed screen display overrides at least a portion of said browser application display to restrict said user from directly accessing said electronic network.

5. The system of claim 4, wherein said search engine comprises reference cards.

6. The system of claim 2, wherein said electronic network is one of an Internet or an intranet system.

7. The system of claim 2, wherein said database site is one of a World Wide Web page, Newsgroup postings, Internet Relay Chat channel, or electronic mail storage.

8. The system of claim 2, further including at least one search engine for searching and reviewing said list.

9. The system of claim 2, wherein said user accesses said system site with a browser application.

10. A system for organizing access to a database that is distributed over an electronic network, comprising:

a dedicated server in communication with said electronic network;

a system site on said dedicated server and having a list of at least one address of at least one approved database site on said electronic network stored thereon, wherein said system site may be accessed by a user with a browser application;

at least one search engine for searching and reviewing said list;

means for accessing said database site with said dedicated server in response to a request from said user;

means for downloading any contents of said accessed database site to said dedicated server;

means for modifying a link in said contents of said database to a second database site to require said second database site to be accessed via said dedicated server;

means for transmitting said downloaded contents from said dedicated server to said user;

means for de-activating a link in said contents of said database to a database site not included in said stored list; and means for bleaching said de-activated link of any distinguishing feature representing an active link.

11. The system of claim 10, further comprising a framed screen display to organize said user access to said approved database site.

12. The system of claim 11, wherein said framed screen display overrides at least a portion of said browser application display to restrict said user from directly accessing said electronic network.

13. The system of claim 10, wherein said electronic network is one of an Internet or an intranet system.

14. The system of claim 10, wherein said database site is one of a World Wide Web page, Newsgroup postings, Internet Relay Chat channel, or electronic mail storage.

* * * * *